United States Patent
Sasaki et al.

(10) Patent No.: US 6,204,583 B1
(45) Date of Patent: Mar. 20, 2001

(54) CENTERPIECE STRUCTURE OF BRUSH-LESS MOTOR AND METHOD OF MANUFACTURING BRUSH-LESS MOTOR

(75) Inventors: Keisuke Sasaki, Toyokawa; Kenji Yoshimura, Toyohashi; Toshio Ishikawa, Kariya, all of (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 09/347,384

(22) Filed: Jul. 6, 1999

(30) Foreign Application Priority Data

Jul. 7, 1998 (JP) .................................................. 10-191743
Jul. 30, 1998 (JP) .................................................. 10-214977

(51) Int. Cl.⁷ .................................................. H02K 21/12
(52) U.S. Cl. ........................ 310/91; 310/67 R; 360/99.08
(58) Field of Search ............................... 310/91, 90, 152, 310/67 R, 68 R; 360/99.08, 99.04, 99.12, 98.07, 97.02; 29/596, 598, 597

(56) References Cited

U.S. PATENT DOCUMENTS

| | | | |
|---|---|---|---|
| 4,423,540 | * 1/1984 | Hishida | 29/460 |
| 4,471,250 | * 9/1984 | Snider | 310/67 R |
| 4,698,542 | * 10/1987 | Muller | 310/67 R |
| 5,160,866 | * 11/1992 | Hishida et al. | 310/90 |
| 5,363,003 | * 11/1994 | Harada et al. | 310/67 R |
| 5,434,729 | * 7/1995 | Katakura et al. | 360/99.08 |
| 5,772,336 | * 6/1998 | Katagiri | 384/129 |
| 5,925,948 | * 7/1999 | Matsumoto | 310/67 R |

FOREIGN PATENT DOCUMENTS 8-9696   1/1996 (JP).

* cited by examiner

Primary Examiner—Tran Nguyen
(74) Attorney, Agent, or Firm—Fish & Richardson P.C.

(57) ABSTRACT

A brush-less motor has a center piece, which has a flange portion fixed to a motor holder and a cylindrical portion fixed to a stator core at the outer periphery of the cylindrical portion. The cylindrical portion has a pair of bearings disposed inside the cylindrical portion to rotatably support said shaft. The center piece is formed by a pressing machine to omit a finishing machine work.

7 Claims, 3 Drawing Sheets

CENTERPIECE STRUCTURE OF BRUSH-LESS MOTOR AND METHOD OF MANUFACTURING BRUSH-LESS MOTOR

CROSS REFERENCE TO RELATED APPLICATION

The present application is based on and claims priority from Japanese Patent Applications: Hei 10-191743, filed on Jul. 7, 1998 and Hei 10-214977, filed on Jul. 30, 1998, the contents of which are incorporated herein by reference.

BACKGROUND OF THE INVENTION

1. Field of the Invention

The present invention relates to a center piece structure of a brush-less motor and a method of manufacturing the brush-less motor.

2. Description of the Related Art

A common outer rotor type brush-less motor has a stator core fixed to an upper surface of a motor holder and a stator winding supported by a center piece which has a flange portion and a cylindrical portion. The cylindrical portion has an inner periphery which supports a pair of bearings, which rotatably supports a rotor shaft.

Usually, such a center piece has been made of aluminum alloy die-cast. However, such a center piece may need another machining step for finishing to provide necessary precision and bearing's retaining surfaces. This increases production cost and time.

SUMMARY OF THE INVENTION

A main object of the invention is to provide a brush-less motor having an improved center piece structure.

According to a preferred embodiment of the invention, a brush-less motor includes a press-formed center piece which does not require additional finishing step.

The cylindrical portion may have a cut-down projection extending radially inward to position bearing members in the axial direction thereof.

According to another preferred embodiment of the invention, a method of manufacturing a brush-less motor including a step of providing a stator winding on the stator core, and a step of fixing an outer periphery of the cylindrical portion to the stator core thereafter.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
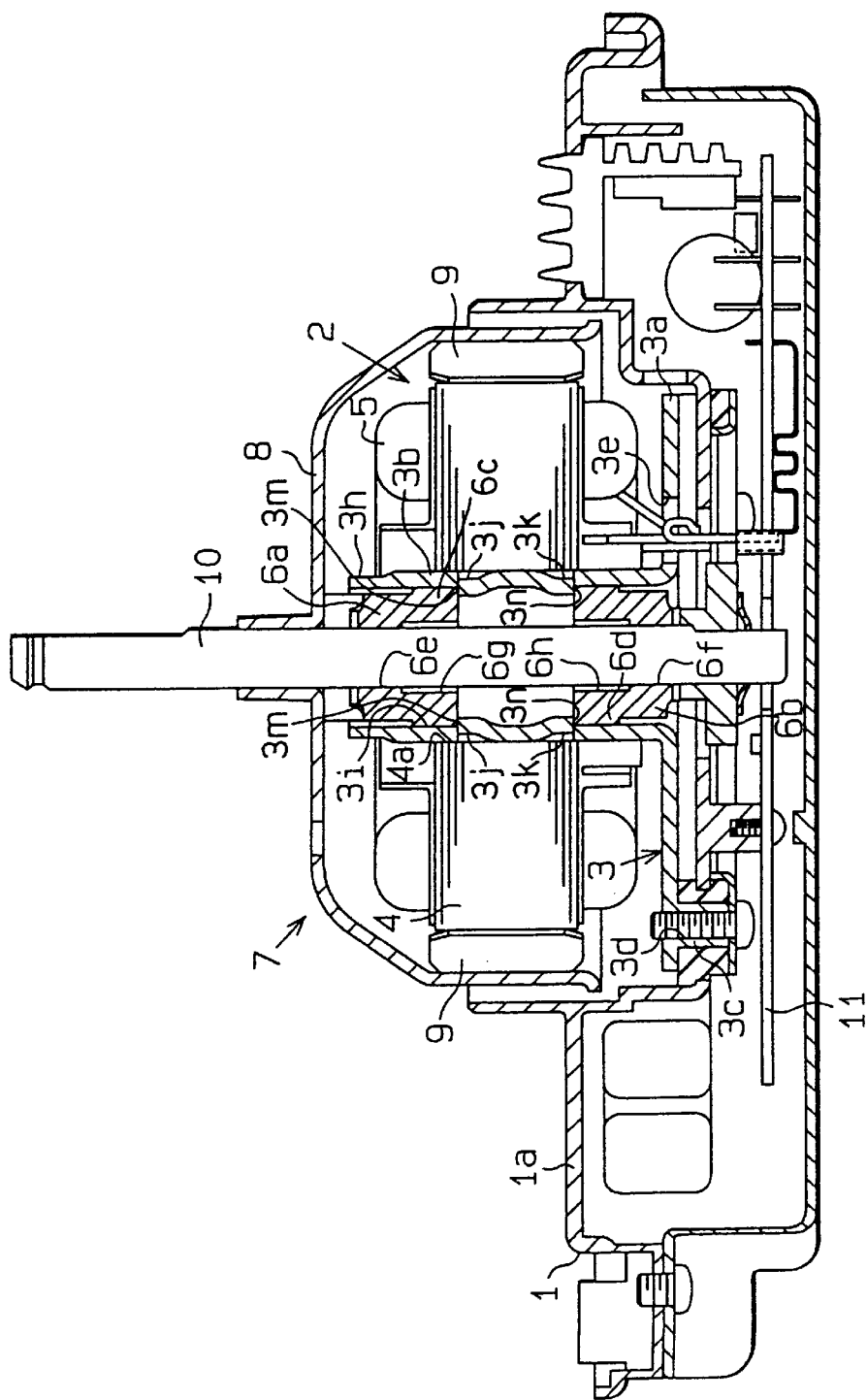
FIG. 1 is a cross-sectional view illustrating a brush-less motor according to a preferred embodiment of the invention.

As shown in FIG. 1, stator 2 is fixed to upper surface 1a of motor holder 1. Stator 2 has center piece 3, stator core 4 and stator winding 5. Stator core 4 has a central opening 4a, a plurality of teeth extending radially outward, and slots formed therebetween. Stator winding 5 is wound around the teeth in a well-known manner, however, before stator core 4 is fixed to center piece 3, because sufficient space for a winding tool can be provided. This can provide stator 2 with any one of various types of stator windings easily.

Figure 3:
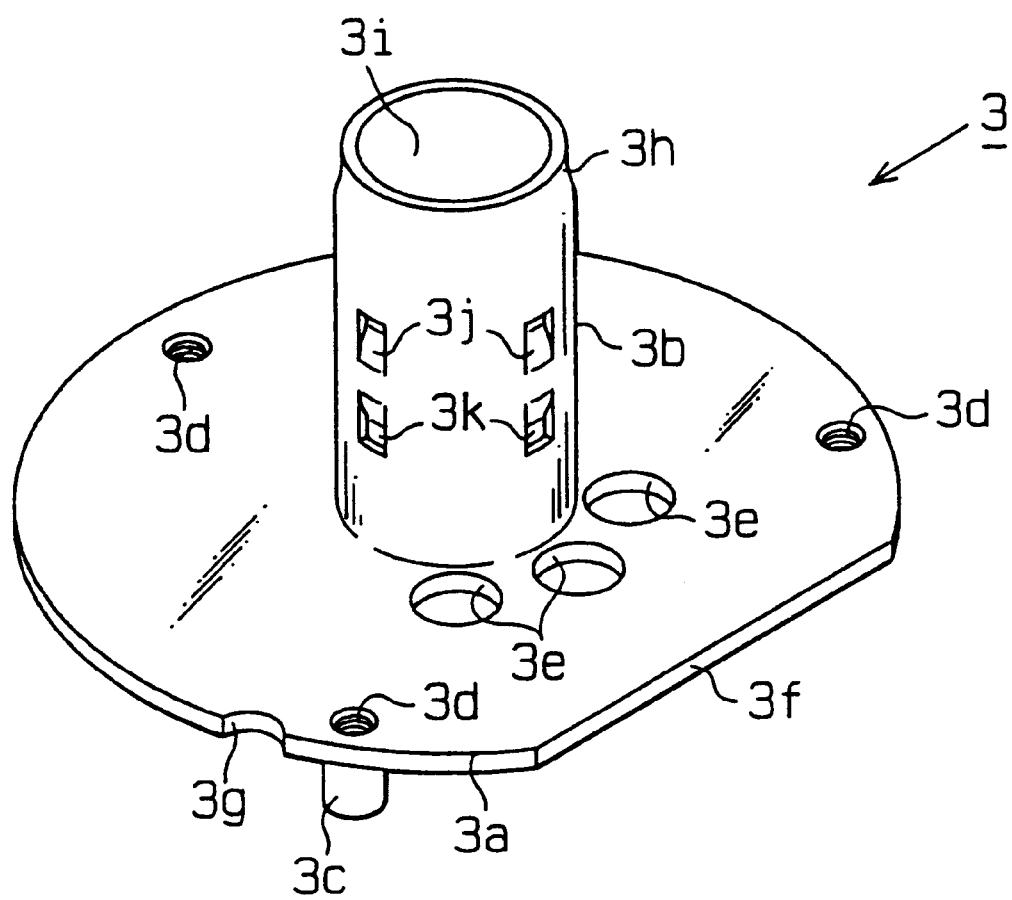
FIG. 3 is a center piece of the brush-less motor illustrated in FIG. 1.

As shown in FIG. 3, center piece 3 is press-formed from a metal plate such as iron alloy or steel to have semi-annular flange 3a and cylindrical portion 3b extending from a central portion of flange 3a. Three projections 3c project downward from the lower peripheral surface of flange 3a. Each projection 3c has a through screw hole 3d therein. Three openings 3e are also formed in flange 3a near cylindrical portion 3b, through which lead wires of stator winding 5 pass to be connected to printed circuit board 11. Flange 3a has straight edge 3f and a circular edge having concavity 3g. Cylindrical portion 3b has end portion 3h of a reduced outside diameter and inner periphery 3i. Four upper cut-down projections 3j and four lower cut-down projections 3k are respectively formed at the axially middle of cylindrical portion 3b at equal intervals to project radially inward therefrom. Cut-down projections 3j, 3k provide retaining surfaces 3m, 3n.

Figure 2:
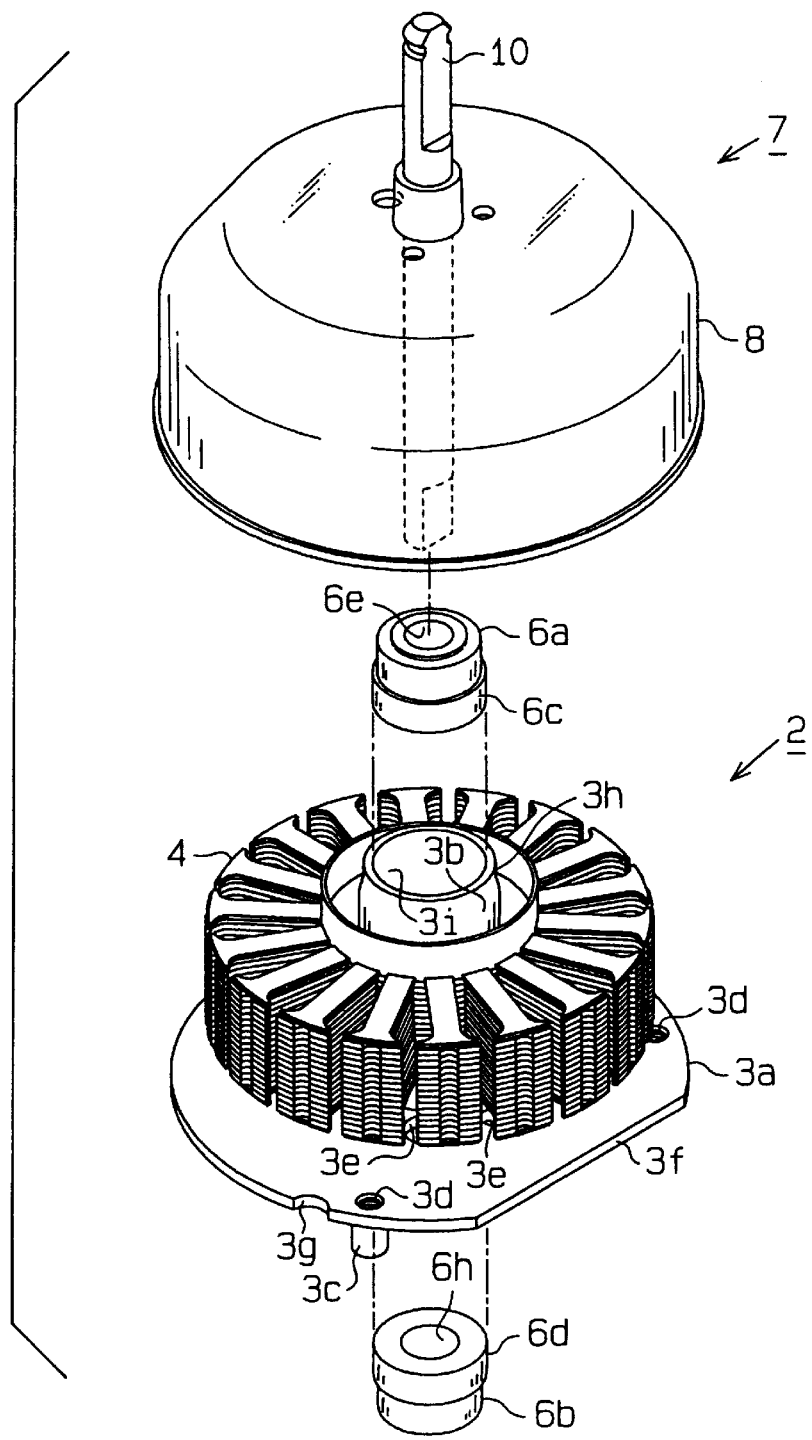
FIG. 2 is an exploded view illustrating a main portion of the brush-less motor illustrated in FIG. 1.

Because center piece 3 is press-formed, cylindrical portion 3b can be inserted into center hole 4a of stator core 4, as shown in FIG. 2, without additional machine-finishing step.

Upper bearing 6a has a bearing portion which supports rotor shaft 10 and an axially extending portion 6c. Axially extending portion 6c has an outer periphery press-fitted into inner periphery 3i of cylindrical portion 3b from the upper end thereof and an inner periphery whose diameter is much larger than the diameter of the rotor shaft 10. Lower bearing 6b has a bearing portion which supports rotor shaft 10 and an axially extending portion 6d. Axially extending portion 6d has an outer periphery press-fitted into inner periphery 3i from the lower end thereof and an inner periphery whose diameter is much larger than the diameter of the rotor shaft 10. Each of the bearing portions of bearings 6a, 6b has outer periphery whose diameter is smaller than the diameter of axially extending portions 6c, 6d.

Although the outer periphery of extending portions 6c, 6d may shrink when bearings 6a, 6b are press-fitted into the inner periphery 3i of cylindrical portion 3b, the bearing portions do not shrink. As a result, both bearings 6a and 6b are respectively retained and positioned in the axial direction by retaining surfaces 3m, 3n so that inner bearing surfaces 6e, 6f of bearings 6a, 6b correctly support rotor shaft 10.

Rotor shaft 10 is then press-fitted into bearing surfaces 6e, 6f, so that rotor 7 can be rotatably supported by stator 2 via center piece 3. Bell-shaped yoke 8, which has a center boss and a plurality of permanent magnets 9 fixed to the inner periphery thereof, is also press-fitted to rotor shaft 10 at the center boss to rotate therewith. Yoke 8 surrounds stator 2 so that permanent magnets 9 can face stator core 4.

Printed circuit board 11, which has a field exciting circuit therein, is fixed to the lower surface of motor holder 1. When stator winding 5 is energized by the exciting circuit, stator 2 provides a rotating magnetic field to rotate rotor 7.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A center piece structure of a brush-less motor including a motor holder, a rotor, a stator core having a central hole, said center piece structure comprising:

a flange portion fixed to said motor holder;

a cylindrical portion having outer periphery fixed to said central hole of said stator core and an inner periphery with at least a pair of integrally formed retaining surfaces; and a pair of bearings disposed inside thereof in contact with said retaining surfaces to rotatably support said rotor at a prescribed axial position; wherein said center piece is press-formed to provide said pair of retaining surfaces together with said cylindrical portion.

2. The center piece structure of a brushless motor as in claim 1, wherein said cylindrical portion has at least a pair of cut-down projections extending radially inward to form said retaining surfaces.

3. The center piece structure of a brushless motor as in claim 1, wherein said center piece is made of a metal plate.

4. The center piece structure of a brushless motor as in claim 1, wherein each of said bearings comprises a bearing portion and a extending portion, and said extending portion has an inside diameter larger than said bearing portion.

5. A center piece structure of a brush-less motor including a motor holder, a rotor having a shaft, a stator having a stator core with a center hole and a stator winding, said center piece structure comprising:

a flange portion fixed to said motor holder;

a cylindrical portion having outer periphery press-fitted to said center hole of said stator core and an inner periphery with at least a pair of integrally formed retaining surfaces spaced apart from each other in an axial direction; and a pair of bearings disposed inside thereof in contact with said retaining surfaces to rotatably support said rotor at a prescribed axial position, wherein each of said pair of bearings has a bearing portion supporting said rotor shaft and an extending portion having an outer periphery press-fitted into said inner periphery of said cylindrical portion, said bearing portion has an outside diameter smaller than said outer periphery of said extending portion, and said extending portion has an inside diameter larger than said bearing portion.

6. The center piece structure of a brushless motor as in claim 5, wherein said cylindrical portion has at least a pair of cut-down projections extending radially inward to form said retaining surfaces.

7. A center piece structure of a brush-less motor including a motor holder, a rotor having a shaft, a stator having a stator core with a center hole and a stator winding, said center piece structure comprising:

a flange portion fixed to said motor holder;

a cylindrical portion having outer periphery press-fitted to said center hole of said stator core and an inner periphery with at least a pair of integrally formed retaining surfaces spaced apart from each othe in an axial direction; and a pair of bearings disposed inside thereof in contact with said retaining surfaces to rotatably support said rotor at a prescribed axial position, wherein said cylindrical portion has at least a pair of cutdown projections extending radially inward to form said retaining surfaces.

* * * * *